United States Patent [19]

Mueller et al.

[11] Patent Number: 4,715,634

[45] Date of Patent: Dec. 29, 1987

[54] WEED EXTRACTING TOOL

[76] Inventors: Teresa L. Mueller; Michael W. Mueller, both of 1329 W. Laguna Azul, Mesa, Ariz. 85202

[21] Appl. No.: 21,205

[22] Filed: Mar. 3, 1987

[51] Int. Cl.$^4$ .............................................. A01B 1/16
[52] U.S. Cl. ................................... 294/50.5; 294/50.7
[58] Field of Search .............................. 294/50–50.7, 294/60; 30/130; 172/21, 22; 254/132

[56] References Cited

U.S. PATENT DOCUMENTS

| | | | |
|---|---|---|---|
| 684,010 | 10/1901 | Thalheimer | 294/50.7 X |
| 1,260,264 | 3/1918 | Huszar | 30/130 |
| 1,692,436 | 11/1928 | Deane | 294/50.5 X |
| 2,531,297 | 11/1950 | Rose | 294/50.7 |
| 2,635,001 | 4/1953 | Slinkman | 294/50.5 |
| 3,149,873 | 9/1964 | Mockabee | 294/50.7 X |
| 3,210,112 | 10/1965 | Glynn | 294/50.7 |

FOREIGN PATENT DOCUMENTS

| | | | |
|---|---|---|---|
| 55125 | 8/1938 | Denmark | 294/50.5 |
| 598340 | 6/1934 | Fed. Rep. of Germany | 294/50.5 |
| 12252 | of 1902 | United Kingdom | 294/50.5 |
| 638898 | 6/1950 | United Kingdom | 294/50.7 |

Primary Examiner—Johnny D. Cherry
Attorney, Agent, or Firm—Herbert E. Haynes, Jr.

[57] ABSTRACT

A weed extracting tool includes an elongated shaft having a handle at its upper end and a cutting head at its lower end. The cutting head includes a tubular housing and a semi-circular blade depending from the housing. An ejector device is reciprocable within the tubular housing for clearing weeds and soil from the cutting head. The ejector is biased to an extended position by means of a compression spring. A latching device holds the ejector in a retracted position against the bias of the spring.

12 Claims, 3 Drawing Figures

WEED EXTRACTING TOOL

BACKGROUND OF THE INVENTION

1. Field of the Invention

This invention relates in general to gardening tools and, more particularly, to a device for completely removing weeds and their roots from the ground.

2. Summary of the Prior Art

Perhaps the most common tool used for extracting weeds from the ground is the simple garden spade, a long-handled, bladed implement which a gardener typically drives into the ground using his or her foot and then withdraws, with the weed and surrounding soil adhering to the blade. The spade can be a very tedious and time-consuming instrument to use, primarily because it is necessary to scrape off the blade or bang it against the ground after each use so that the spade will be clean and in condition for extracting other weeds.

For this reason, a number of weed extracting tools have been developed which include some type of ejecting device for knocking or releasing weeds and soil out of the tool between uses. Examples of such tools are found in U.S. Pat. Nos. 2,030,770 to Smith, 2,217,109 to Gillmor, 3,123,391 to Novak, and 3,210,112 to Glynn. Also of interest are U.S. Pat. Nos. 3,444,938 to Ballman, 3,534,994 to Sterk, and 4,556,114 to Ryan. The latter patents, however, are directed to soil sampling devices deigned to extract uniformly sized core samples, and are not designed specifically for digging out weeds.

Of the above documents, perhaps the most relevant is U.S. Pat. No. 2,030,770 to Smith. The weed extracting tool disclosed by Smith comprises a cutting head consisting of a pair of opposed, concavo-convex cutting blades and an ejector device mounted for reciprocation between the blades. The ejector device of Smith is biased to a retracted position, so that after the operator exerts a downward force on the device to knock out weeds and soil, the ejector automatically snaps back up to its retracted position. The device of Smith suffers from a number of shortcomings. One problem is that the two-blade cutting head does not allow for optimum digging performance. The two blades have to overcome twice as much friction as a single blade, and in addition, do not penetrate the earth as effectively since the initial penetrating force is not localized in a single area. Also, the cutting head is not useful for extracting weeds having roots or branches which extend beyond the area enclosed between the two blades. In addition, because the blades almost entirely surround the soil plug area, the operator cannot easily look inside the cutting head to see whether all the soil has been removed. Another problem is that, because the ejector is biased to a retracted position, the operator may have to exert a great deal of muscular force in overcoming both the bias of the ejector and the force of the soil clinging to the blades. This is especially troublesome when the soil is damp and tightly compacted.

The weed extracting tool disclosed in U.S. Pat. No. 3,210,112 to Glynn is similar to the tool disclosed by Smith, but comprises a cylindrical cutting head having an inclined open end. The cylindrical cutting head, like the two-blade head of Smith, limits the size of weed and area of soil which can be pulled up. In addition, as in the Smith invention, the ejector device of Glynn is biased to a retracted position and thus may require an undue amount of strength to be activated. Furthermore, the control for the ejector device of Smith is located in the upper portion of the handle, and thus requires that a long rod be extended through the entire length of the handle, from the control at the top to the ejector head at the bottom. This adds unnecessarily to the cost and difficulty of manufacturing the product.

Thus, there exists a long-felt need for a new and improved weed extracting device which overcomes some of the difficulties and shortcomings of the prior art.

SUMMARY OF THE INVENTION

In accordance with the present invention, a new and improved apparatus for extracting weeds is disclosed. The apparatus comprises an elongated vertically oriented shaft having a handle at its upper end and a cutting head at its lower end. Preferably, a foot rest projects outwardly from the shaft at a location slightly above the cutting head so that the operator may exert ground penetrating forces, although it may be possible to eliminate the foot rest and provide the apparatus with a shorter shaft for hand weeding operations.

The cutting head includes a tubular housing with an elongated semi-circular blade on its depending end. Preferably, the cutting edge of the blade is provided with a plurality of teeth to improve the soil-cutting ability of the tool. The single blade configuration aligns for the angle of attack of the weed extractor to be varied in a manner similar to the way a garden spade is used. Also it allows unobstructed visibility so that the operator may inspect the cutting head.

In addition, an ejector device is mounted for reciprocation within the tubular housing for clearing the cutting head of soil and weeds. The ejector device includes a plunger member carried on the depending end of a shaft which extends coaxially within the housing of the cutting head. Biasing means are provided for biasing the shaft, and thus the plunger, downwardly, in addition, a releasable latching device is included for holding the plunger and shaft up against the force exerted by the biasing means. Thus, in order to eject soil and weeds from the cutting head, it is simply necessary for the operator to release the latching means, allowing both gravity and the force of the biasing means to thrust the plunger downwardly. To set the device for re-use, the operator must move the plunger upwardly against the force of the biasing means and relatch the plunger in its retracted position.

It is therefore, an object of this invention to provide a weed extracting tool having a cutting head and a new and improved ejector device for dislodging plugs of soil and weeds from the cutting head.

Another object of the invention is to provide a weed extracting tool as described above with means for biasing the ejector device to an extended position so that the operator can activate the device with a minimum of muscular force.

Still another object of the invention is to provide the cutting head of the weed extracting tool with an improved blade configuration for optimizing digging performance.

The foregoing and other objects of the present invention as well as the invention itself, may be more fully understood from the following description when read in conjunction with the accompanying drawings.

DESCRIPTION OF THE PREFERRED EMBODIMENTS

Figure 1:
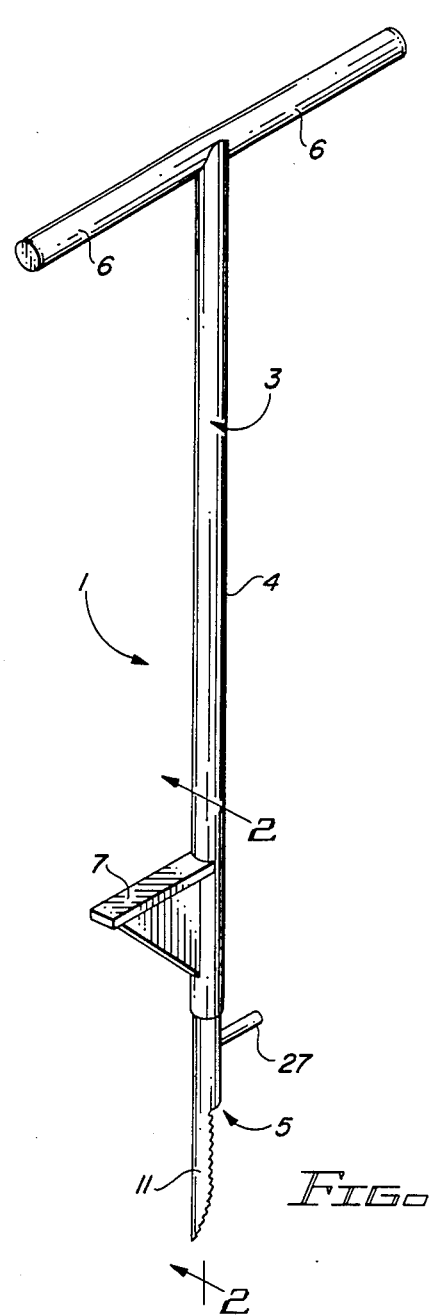
FIG. 1 is a perspective view showing the weed extracting tool of the present invention.
Figure 2:
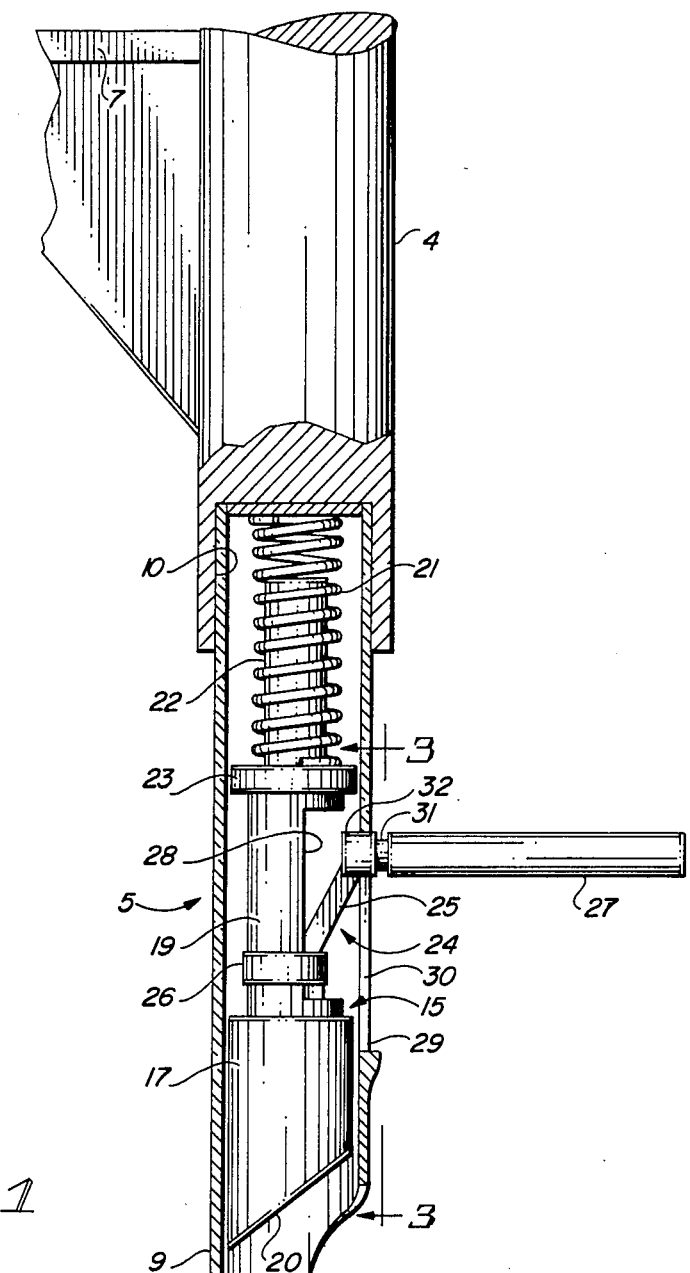
FIG. 2 is an enlarged sectional view taken through line 2—2 of FIG. 1.
Figure 3:
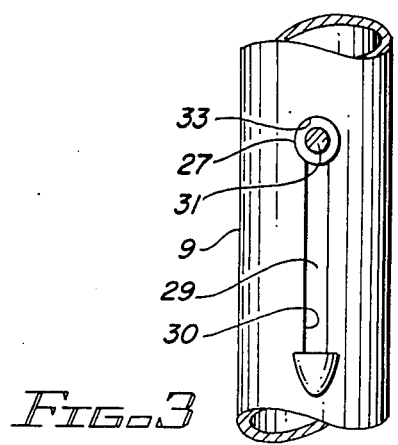
FIG. 3 is a fragmentary sectional view taken through line 3—3 of FIG. 2.

Referring more particularly to the drawings, FIG. 1 is a perspective view of the weed extracting tool of the present invention, generally indicated by the numeral 1. The tool 1 includes a T-shaped handle means 3 having a cutting head assembly 5 provided on its lower end. In the illustrated embodiment, the handle includes an elongated vertical shaft 4 with a crossbar that provides an oppositely extending pair of horizontal handle bars 6 extending normally from the upper end of the shaft. A foot rests 7 extends perpendicularly from near the lower end of the shaft 4 to allow the operator to drive the cutting head 5 into the ground while in a standing position. In another embodiment (not shown), however, the foot rest 7 can be eliminated and the handle means 3 can be shorter and otherwise configured as desired for hand weeding operations.

The cutting head 5 includes a tubular housing 9 which is carried on the lower end of the handle shaft 4 such as by being suitably affixed in a downwardly opening axial socket 10. The cutting head has an elongated essentially semi-cylindrical blade 11 formed on its depending end. The cutting edge of the blade is tapered upwardly from a pointed lower end 12 and, preferably, is provided with a plurality of jagged teeth 13, which improve the soil-cutting ability of the tool. In addition, an ejector device 15 is mounted for reciprocation within the cutting head for dislodging trapped soil and weeds from the blade 11.

The ejector device 15 includes a plunger member 17 carried on the depending end of a shaft 19 which extends coaxially within the housing 9 of the cutting head. Preferably the plunger 17 is essentially cylindrical, with an inclined bottom edge 20 for assisting the ejection of soil and weeds. The shaft 19, and thus the plunger 17, are biased downwardly by a spring 21 having its upper end in bearing engagement with the closed top of housing 9 and its lower end carried by an upstanding boss 22 provided on an annular flange 23 extending radially from shaft 19. The shaft 19 and the plunger 17 are held up in the illustrated position, against the bias of the spring 21, by a latching device 24.

The latching device 24 includes a leaf spring 25 which is suitably attached to the shaft 19 such as by means of a clamp, or band 26 which holds the proximal end of the spring in engagement with a flat 28 formed in the shaft. A knob 27 is fixedly carried on the distal end of the leaf spring 25 so as to extend laterally through a keyhole shaped slot 29 formed in the housing 9. The knob 27 is preferably elongated for easy accessibility and is formed with an annular groove 31 defining a reduced diameter portion which is slidably movable in the elongated relatively narrow portion 30 of the keyhole shaped slot 29 when the knob 27 is pushed manually toward the shaft 19.

Thus, in order to eject soil and weeds from the cutting head 5, it is simply necessary for the operator to push inwardly on knob 27 to release the latching device 24, allowing both gravity and the force of the spring 21 to thrust the plunger downwardly. To set the device for re-use, the operator must again latch the ejector device by pulling up knob 27, whereupon the leaf spring 25 pushes the knob 27 laterally so that the larger diameter portion 32 of the knob will become locked in circular portion 33 of the keyhole shaped slot 29.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

I claim as my invention:

1. A tool for extracting weeds and soil from the ground, the tool comprising:
   (a) a T-shaped handle having a lower end and an upper end;
   (b) a cutting head, said cutting head including,
      (i) a tubular housing secured to the lower end of said handle,
      (ii) a blade depending from said housing; and
   (c) ejector means mounted for reciprocation within said tubular housing for dislodging trapped soil and weeds from said cutting head, said ejector means including,
      (i) shaft means coaxially disposed within said housing,
      (ii) a plunger member depending from a lower end of said shaft means,
      (iii) biasing means for biasing said shaft means and said plunger member downwardly to an extended position, and
      (iv) latching means for holding said shaft means and said plunger member in a retracted position against the bias of said biasing means, said latching means comprising elements of a releasable interconnection on said shaft means and on said tubular housing for releasably securing said shaft means to said housing, said elements of a releasable interconnection including,
         (1) a keyhole shaped slot formed in said tubular housing, said slot including an elongated relatively narrow portion depending from an upper circular portion
         (2) elongated knob means movably connected to said shaft means, said knob means being disposed to extend through said keyhole shaped slot of said tubular housing and including a reduced diameter portion and a larger diameter portion and being movable from a first position in which said larger diameter portion extends through said circular portion of sid keyhole shaped slot to a secured position in which said reduced diameter portion is slidable in said elongated relatively narrow portion of said keyhole shaped slot and
         (3) means for biasing said knob means to said first position.

2. The tool of claim 1, in which said means for biasing said knob means comprises a leaf spring extending between said shaft means and said knob means.

3. The tool of claim 1, in which said plunger member is essentially cylindrical and includes an inclined bottom edge.

4. The tool of claim 1, in which said means for biasing said shaft means and said plunger to said extended position comprises a compression spring disposed in said tubular housing above said shaft means to exert a downwardly directed biasing force on said shaft means.

5. The tool of claim 1, in which said handle comprises a foot rest for driving said cutting head into the ground.

6. The tool of claim 1, in which said blade is essentially semi-cylindrical and includes a tapered cutting edge.

7. The tool of claim 6, in which said tapered cutting edge includes a plurality of jagged teeth.

8. A tool for extracting weeds and soil from the ground, the tool comprising:
   (a) a handle having a lower end and an upper end;
   (b) a cutting head, said cutting head including,
      (i) a tubular housing secured to the lower end of said handle, said housing having a keyhole shaped slot including an elongated relatively narrow portion and a circular portion formed therein,
      (ii) a blade depending integrally from said housing; and
   (c) ejector means mounted for reciprocation within said tubular housing for dislodging soil and weeds from said cutting head, said ejector means including,
      (i) shaft means extending coaxially within said housing,
      (ii) a plunger member depending from a lower end of said shaft means,
      (iii) biasing means for biasing said shaft means and said plunger member downwardly to an extended position, and
      (iv) latching means for holding said shaft means and said plunger member in a retracted position against the bias of said biasing means, said latching means including,
         (1) spring means attached at one end to said shaft means and
         (2) elongated knob means movably carried on the distal end of said spring means, said knob means including a reduced diameter portion and a larger diameter portion and being movable against the bias of said spring means from a first position in which said larger diameter portion extends through said circular portion of said key-shaped slot to a second position in which said reduced diameter portion is slidable in said elongated relatively narrow portion of said keyhole shaped slot.

9. The tool of claim 8 in which said spring means comprises a leaf spring.

10. The tool of claim 8, in which said handle comprises an elongated vertical shaft with a pair of horizontal handle bars extending normally from the upper end of said shaft.

11. The tool of claim 10, in which said handle further includes a foot rest extending perpendicularly from near the lower end of said shaft to facilitate driving said cutting head into the ground.

12. The tool of claim 8, in which said plunger member is essentially cylindrical and includes an inclined bottom edge.

* * * * *